United States Patent
Sasakuma

(10) Patent No.: US 10,455,101 B2
(45) Date of Patent: Oct. 22, 2019

(54) SERVER, IMAGE PROCESSING UNIT, AND NON-TRANSITORY RECORDING MEDIUM FOR DISPLAYING ERROR SCREEN

(71) Applicant: Konica Minolta, Inc., Tokyo (JP)

(72) Inventor: Haruna Sasakuma, Toyonaka (JP)

(73) Assignee: Konica Minolta, Inc., Tokyo (JP)

( * ) Notice: Subject to any disclaimer, the term of this patent is extended or adjusted under 35 U.S.C. 154(b) by 0 days.

(21) Appl. No.: 15/849,875

(22) Filed: Dec. 21, 2017

(65) Prior Publication Data
US 2018/0183955 A1 Jun. 28, 2018

(30) Foreign Application Priority Data
Dec. 26, 2016 (JP) .................................. 2016-251090

(51) Int. Cl.
*H04N 1/00* (2006.01)
*H04N 1/32* (2006.01)

(52) U.S. Cl.
CPC ..... *H04N 1/00477* (2013.01); *H04N 1/00037* (2013.01); *H04N 1/00244* (2013.01); *H04N 1/00411* (2013.01); *H04N 1/32635* (2013.01); *H04N 2201/0094* (2013.01)

(58) Field of Classification Search
CPC ........... H04N 1/00477; H04N 1/00037; H04N 1/00244; H04N 1/00411; H04N 1/32635; H04N 2201/0094
See application file for complete search history.

(56) References Cited

U.S. PATENT DOCUMENTS

| | | | |
|---|---|---|---|
| 2007/0263621 A1* | 11/2007 | Oshima | H04L 12/281 370/389 |
| 2014/0146179 A1* | 5/2014 | Harada | H04N 1/0035 348/160 |
| 2014/0168698 A1* | 6/2014 | Okada | G06F 3/1236 358/1.15 |
| 2016/0094634 A1* | 3/2016 | Nosaki | H04L 67/1002 709/205 |

FOREIGN PATENT DOCUMENTS

| | | |
|---|---|---|
| JP | 2007-286723 A | 11/2007 |
| JP | 2008-003833 A | 1/2008 |
| JP | 2013-90264 A | 5/2013 |

* cited by examiner

*Primary Examiner* — Iriana Cruz
(74) *Attorney, Agent, or Firm* — Osha Liang LLP

(57) ABSTRACT

A server connected to an image processing device over a network, executes: running an application that operates in cooperation with the image processing device; obtaining screen information to use the application from the application based on a request from an external device; outputting the screen information to the external device; detecting an error on the image processing device with which the application operates in cooperation; and adding error information to access an error screen constructed by the image processing device to the screen information when the error on the image processing device is detected. The server outputs the screen information with added the error information to the external device when the error information is added to the screen information.

14 Claims, 13 Drawing Sheets

FIG. 4

DEVICE INFORMATION 36

| DEVICE NAME | IP ADDRESS | SCAN | | | PRINT | | | | | FAX |
|---|---|---|---|---|---|---|---|---|---|---|
| | | COLOR | RESOLUTION | FILE | COLOR | 2-SIDED | BOOKLET | PUNCHING | | |
| SERVER | 150.*.*.001 | — | — | — | — | — | — | — | | — |
| IMAGE PROCESSING DEVICE A | 150.*.*.002 | OK | 600*600 | pdf, xps | OK | OK | OK | OK | | OK |
| IMAGE PROCESSING DEVICE B | 150.*.*.003 | OK | 400*400 | jpeg, tiff | OK | OK | OK | OK | | OK |
| IMAGE PROCESSING DEVICE C | 150.*.*.004 | OK | 200*200 | jpeg, tiff | OK | NG | NG | NG | | OK |
| IMAGE PROCESSING DEVICE D | 150.*.*.005 | NG | 600*400 | pdf, xps | NG | OK | OK | NG | | OK |

FIG. 5

APPLICATION INFORMATION 37

| APPLICATION NAME | DESTINATION | SCAN | | | PRINT | | |
|---|---|---|---|---|---|---|---|
| | | COLOR | RESOLUTION | FILE | COLOR | 2-SIDED | BOOKLET |
| APPLICATION A | http://150.*.*.001/app_A | NO | NO | NO | YES | YES | NO |
| APPLICATION B | http://150.*.*.001/app_B | YES | 200*200 | jpg, tiff | NO | NO | NO |
| APPLICATION C | http://150.*.*.001/app_C | YES | 600*600 | pdf, xps | YES | YES | NO |
| APPLICATION D | http://150.*.*.001/app_D | NO | 200*200 | pdf, xps | NO | YES | NO |

| PUNCHING | FAX | COOPERATE DEVICE |
|---|---|---|
| YES | NO | IMAGE PROCESSING DEVICES A, B |
| NO | NO | IMAGE PROCESSING DEVICES B, C |
| NO | NO | IMAGE PROCESSING DEVICE A |
| NO | YES | IMAGE PROCESSING DEVICES A, D |

FIG. 6A

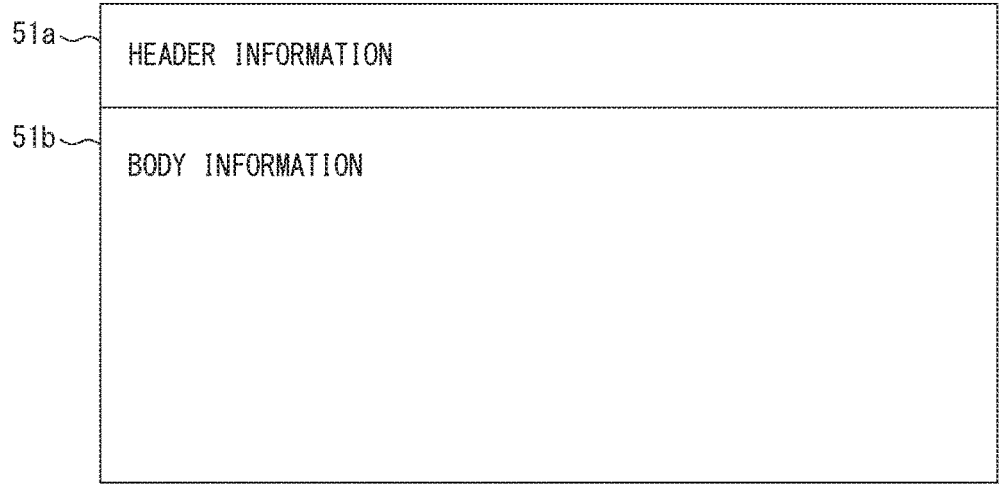

FIG. 6B

```
<p>//copies
<label id='copyname'>copies</label>
<input id='copycalue' type='test' value='1'/>
</p>
<p>//Duplex
<label id='duplex'>Duplex</label>
<select id='duplexvalue' name='duplexmode'
<option value='On_duplex' selected>On</option>
<option value='Off_duplex'>Off</option>
</p>
<p>//start button
<input id="startbutton"value="Copy"onclick="jikkou.start()">
</p>
    .
    .
    .
```

FIG. 8

```
<p>//copies
<label id='copyname'>copies</label>
<input id='copycalue' type='test' value='1' />
</p>
<p>//Duplex
<label id='duplex'>Duplex</label>
<select id='duplexvalue' name='duplexmode'
<option value='On_duplex' selected>On</option>
<option value='Off_duplex'>Off</option>
</p>
<p>//start button
<input id="startbutton"value="Copy"onclick="jikkou.start()">
</p>
   .
   .
   .
<iframe src="http://150.***.***.002/DevicePanel"name="MFP_B"
width="100" height="150">
</iframe>
```

51b (top), 52 (iframe block)

SERVER, IMAGE PROCESSING UNIT, AND NON-TRANSITORY RECORDING MEDIUM FOR DISPLAYING ERROR SCREEN

CROSS-REFERENCE TO RELATED APPLICATIONS

The entire disclosure of Japanese patent application No. 2016-251090 filed on Dec. 26, 2016, is incorporated herein by reference in its entirety.

BACKGROUND

Technical Field

The present invention relates to a server, an image processing unit and a non-transitory recording medium. The present invention more specifically relates to a technique to run an application on the server connected to an image processing device over a network, thereby enabling the application to operate in cooperation with the image processing device.

Description of the Related Art

A conventional image processing device that may be a MFP (Multifunction Peripherals) with multiple functions such as a copy function, a scanning function and a print function are capable of performing input jobs. Some examples of the input jobs include a variety of jobs relating to image processing such as copy jobs, scanning jobs and print jobs. There may be more than one image processing devices placed in a place such as an office.

Recently, people are willing to have image processing devices capable of performing jobs in cooperation with a cloud service. The jobs to be performed on the image processing device include, for example, jobs to directly submit image data of a document obtained in the scanning function to a storage on the cloud and store it therein and/or jobs to directly download the data stored in the storage on the cloud to print.

In order to meet the request, a browser is equipped with the conventional image processing device, and the browser allows cooperation between each function of the image processing device and the cloud service. This known technique is introduced for example in Japanese Patent Application Laid-Open No. JP 2013-90264 A.

According to the known technique, when, for example, the browser accesses the cloud service to display a web page, it analyzes the web page, thereby designating the function in the image processing device to be used by the cloud service and displaying the web page relating to the designated function constructed inside the image processing device together with the web page provided by the cloud service. Specifically, according to the known technique, installation of a dedicated browser application on the image processing device allows cooperation between the image processing device and the cloud service.

This, however, requires registration of the application that allows cooperation with the cloud service with every image processing device located in the office, for instance. An administrator needs to implement bothersome registration, and it is also difficult for him or her to manage each application. The application to cooperate with the cloud service may only be registered with the limited number of the multiple image processing devices. In such a case, if a user uses the image processing device without the application, the job to perform in cooperation with the cloud service cannot be processed, resulting in less user-friendliness.

In recent years, it is required to develop a system that include a server located on a network to which multiple image processing devices are connected and implement registration of the application capable of performing in cooperation with the multiple image processing devices with the server. The application registered with the server allows operation in cooperation with the network connected image processing device to process the job on the image processing device and in cooperation with the cloud service. Hence, the user with the system operates the application by accessing the server, thereby allowing cooperation between each of the multiple image processing devices and the cloud service.

In a case where the aforementioned system is developed, the application operated on the server may be in communication with each image processing device to execute each function in the image processing device. Communication between the application and each image processing device may be over a predetermined protocol and command. This allows third vendors to develop the application operated on the server. Moreover, user interfaces meet individual user's requirements may be provided. These realize more user-friendliness.

In the case where an error such as a paper jam is occurred on the image processing device, operations the user has to do to fix the error are different depending on a situation or a location of the paper jam and/or a device type of the image processing device. The application may recognize the occurrence of the error on the image processing device in communication with the image processing device using a predetermined protocol. It is, however, difficult for the application to construct a screen to specifically indicate the operations the user should proceed to fix the error. The application may be provided by the third vendor as described earlier. In such a case, it is very difficult to construct and display the appropriate error screen based on the situation or the location of the paper jam and/or the device type of the image processing device.

SUMMARY

One or more embodiments of the present invention provide a server, an image processing unit and a non-transitory recording medium capable of displaying appropriately image information displayed by an application running on the server and an error screen regarding an error occurred on an image processing device when the error is occurred on the image processing device.

First, one or more embodiments of the present invention are directed to a server connected to an image processing device over a network.

The server of one or more embodiments of the present invention comprises a hardware processor that: runs an application that operates in cooperation with the image processing device; obtains screen information to use the application from the application based on a request from an external device; outputs the screen information obtained from the application to the external device; detects an error on the image processing device with which the application operates in cooperation; and adds error information to access an error screen constructed by the image processing device to the screen information obtained from the application when the error on the image processing device is detected. The hardware processor outputs the screen information with the added error information to the external device when the error information is added to the screen information.

Second, one or more embodiments of the present invention are directed to an image processing unit.

The image processing unit of one or more embodiments of the present invention comprises: the above-described server; and an image processing device that operates in cooperation with an application. The server and the image processing device are connected over a network.

Third, one or more embodiments of the present invention are directed to a non-transitory recording medium storing a computer readable program to be executed by a server connected to an image processing device over a network.

The non-transitory recording medium of one or more embodiments of the present invention stores the computer readable program executed by the server, wherein the program causes the server to execute: (1) running an application that operates in cooperation with the image processing device; (2) obtaining screen information to use the application from the application based on a request from an external device; (3) outputting the screen information obtained from the application to the external device; (4) detecting an error on the image processing device with which the application operates in cooperation; and (5) adding error information to access an error screen constructed by the image processing device to the screen information obtained from the application when the error on the image processing device is detected. The screen information with the added error information is output to the external device when the error information is added to the screen information.

BRIEF DESCRIPTION OF THE DRAWING

The advantages and features provided by one or more embodiments of the invention will become more fully understood from the detailed description given herein below and the appended drawings which are given by way of illustration only, and thus are not intended as a definition of the limits of the present invention.

FIG. 4 illustrates an example of device information according to one or more embodiments;

FIG. 5 illustrates an example of application information according to one or more embodiments;

FIGS. 6A and 6B illustrate examples of screen information output from an application according to one or more embodiments;

FIG. 8 illustrates an example of error information added by an error information adding unit according to one or more embodiments;

DETAILED DESCRIPTION OF EMBODIMENTS

Hereinafter, embodiments the invention will be described with reference to the drawings. However, the scope of the invention is not limited to the disclosed embodiments.

Figure 1:
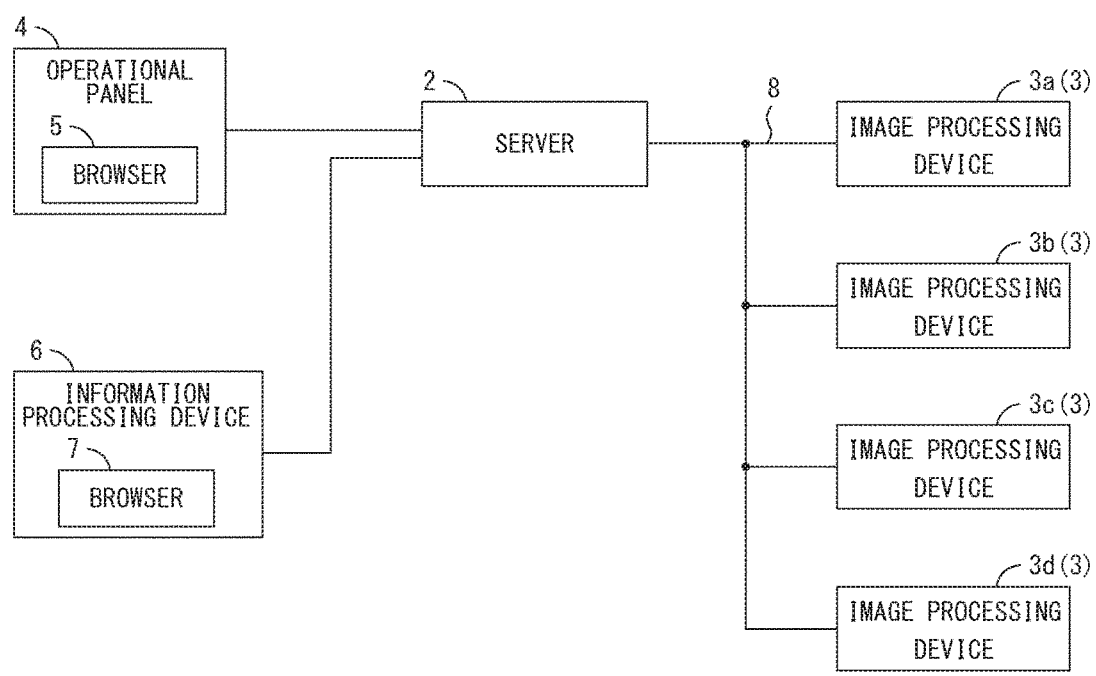
FIG. 1 illustrates an exemplary conceptual configuration of an image processing system in which one or more embodiments may be practiced.

FIG. 1 illustrates an exemplary conceptual configuration of an image processing system 1 in which one or more embodiments of the present invention may be practiced. The image processing system 1 includes network connected server 2 and multiple image processing devices 3a, 3b, 3c and 3d in electronic communication with each other. The communication between the server 2 and the multiple image processing devices 3a, 3b, 3c and 3d may be over a network 8 such as a LAN (Local Area Network). Each of the multiple image processing devices 3a, 3b, 3c and 3d may be a MFP (Multifunction Peripherals), for example, with multiple functions including a scanning function, a print function and a fax function. The server 2 controls the multiple image processing devices 3a, 3b, 3c and 3d to give instructions to process jobs to the respective image processing devices 3a, 3b, 3c and 3d. In FIG. 1, the server 2 is shown with four connected image processing devices 3a, 3b, 3c and 3d as an example. The multiple image processing devices 3a. 3b, 3c and 3d may be collectively referred to herein as the image processing device 3, unless distinction of each image processing device is necessary.

The server 2 is shown with connected external devices such as an operational panel 4 and an information processing device 6 except the multiple image processing devices 3. The operational panel 4 is a dedicated operational device to operate the multiple image processing devices 3 via the server 2, for example. The operational panel 4 is capable of displaying a variety of information and detecting user operations. The operational panel 4 has a browser 5 to obtain and display a web page. The information processing device 6 may be a device constructed by a device such as a personal computer (PC), a tablet terminal or a smartphone. The information processing device 6 is also capable of displaying a variety of information and detecting user operations. The information processing device 6 also has a browser 7 to obtain and display the web page. The network connecting the operational panel 4 and the information processing device 6 may be either the same or the different network from the network 8 connecting the multiple image processing devices 3. When the operational panel 4 and the information processing device 6 are connected to the different network, the server 2 may require a router function.

The server 2 has a function as a web server as described later. The server 2 is shown with various types of applications installed in advance that operate on the web server. The application allows operation in cooperation with at least one image processing device 3 of the multiple image processing devices 3a, 3b, 3c and 3d. The application may enable the image processing device 3 to work together to process the job. The application also allows to operate in cooperation with a cloud server (not shown in the figure) on a cloud on an internet. The application, for example, may enable the image processing device 3 to process the scanning job to obtain image data and upload the image data to the could server. The application may also download data to print from cloud server and send the data to the image processing device 3, thereby enabling the image processing device 3 to print based on the data.

A user boots the browser 7 with the information processing device 6, for example, to have an access to the server 2. The user then operates the application to select one of the multiple image processing devices 3*a*, 3*b*, 3*c* and 3*d* to enable the image processing device 3 to process the job. This is the same when the user operates the operational panel 4.

The image processing system 1 does not require installation of an application on each of the multiple image processing devices 3*a*, 3*b*, 3*c* and 3*d* by an administrator. The administrator is only required to install the application on the server 2 and manage. A less load on the administrator who manages the application may be realized.

Figure 2:
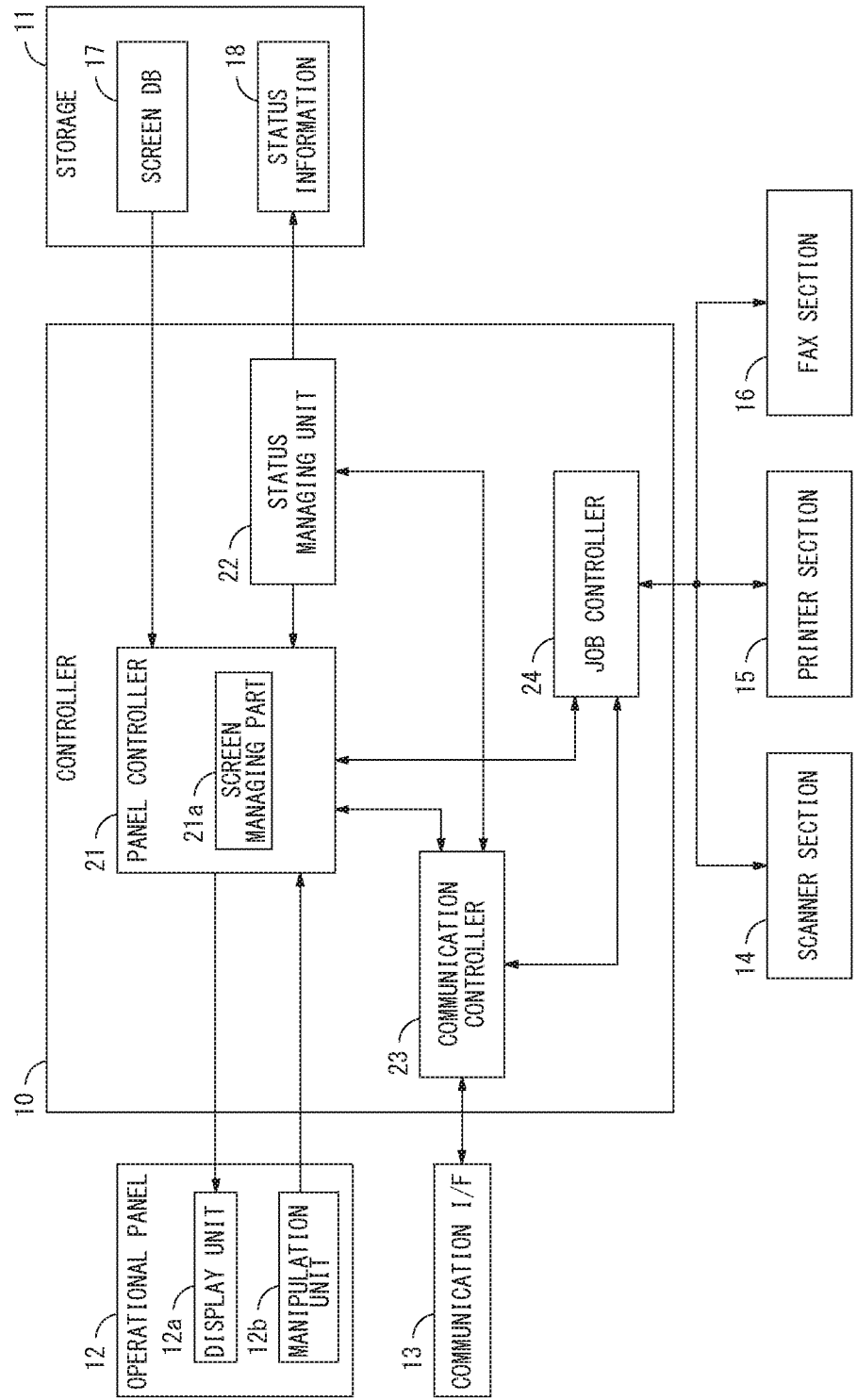
FIG. 2 is a block diagram showing an example of a hardware structure and a functional structure of image processing device according to one or more embodiments.

FIG. 2 is a block diagram showing an example of a hardware structure and a functional structure of the image processing device 3. As its hardware structure, the image processing device 3 includes a controller 10, a storage 11, an operational panel 12, a communication interface 13, a scanner section 14, a printer section 15 and a fax section 16.

The controller 40 may include a CPU and a memory, for instance. The CPU is a hardware processor of the server 2. The controller 10 executes a predetermined program when a power is supplied, thereby serving as a panel controller 21, a status managing unit 22, a communication controller 23 and a job controller 24.

The storage 11 is formed from a non-volatility device such as a hard disk drive (HDD) or a solid state drive (SSD), for example. Various types of screens to be displayed on the operational panel 4 are stored in a screen database (DB) 17. Status information 18 includes current status of the image processing device 3. The screen DB 17 and the status information 18 are stored in the storage 11. The program executed by the CPU of the controller 10 may be stored in the storage 11.

The operational panel 12 is a user interface for a user to directly operate and use the image processing device 3. The operational panel 12 includes a display unit 12*a* and a manipulation unit 12*b*. A variety of information is displayed on the display unit 12*a*. The manipulation unit 12*b* accepts user inputs. The display unit 12*a* is constructed by a device such as a color liquid crystal display, for instance. The manipulation unit 12*b* is constructed by parts such as a touch panel sensor arranged on the display area of the display unit 12*a* and/or push-button keys arranged around the display area of the display unit 12*a*.

The communication interface 13 connects the image processing device 3 to the network 8 allowing communication with the server 2 or another device.

The scanner section 14 optically reads a document placed by the user and constructs image data. It depends on a device type of the image processing device 3 whether or not the scanner section 14 allows reading of a color document. A resolution in document reading or file format of the constructed image data may also depend on the device type of the image processing device 3. Specifically, the detailed functional structure of the scanner section 14 depends on the device type of the image processing device 3.

The printer section 15 forms images on a sheet material such as a printing paper and produces a printed output based on the input image data. The printer section 15 may produce a color output, which depends on the device type of the image processing device 3. Capabilities of 2-sided printing and booklet making or hole punching after printing, for example, may also be depended on the device type of the image processing device 3. Specifically, the detailed functional structure of the printer section 15 depends on the device type of the image processing device 3.

The fax section 16 transmits and receives fax data over public phone lines, which are not shown in figures. The fax function in the image processing device 3 is one of optional functions. The device type without the fax function does not have the fax section 16.

Functions of the controller 10 are explained next. The panel controller 21 controls screens displayed on the display unit 12*a* on the operational panel 12 to accept user input. The panel controller 21 includes a screen managing part 21*a*. The screen managing part 21*a* reads screen information to display on the display unit 12*a* in the screen DB, and loads it into the memory, thereby managing the screen to display on the display unit 12*a*. Specifically, the screen managing part 21*a* manages what screen is currently displayed on the display unit 12*a* on the operational panel 12. The user input may be accepted through the manipulation unit 12*a*. The panel controller 21 then detects information such as a button displayed on a position where the user has selected based on the screen information managed by the screen managing part 21*a*. The panel controller 21 is allowed to specify what input is made by the user. The user may give an instruction to process a job to the job controller 24. In this case, the panel controller 21 outputs the job processing instruction to the job controller 24.

The status managing unit 22 manages current status of the image processing device 3. In the case where the error such as the paper jam is occurred on the image processing device 3. The status managing unit 22 then detects the error, and records information indicating to be in error with the status information 18. Once the status managing unit 22 detects the occurrence of the error, it notifies the panel controller 21 of the error occurrence.

Once the error occurrence is notified by the status managing unit 22, the panel controller 21 brings the screen managing part 21*a* into operation. The screen managing part 21*a* reads the screen information corresponding to the error in the screen DB 17 and displays the react screen information on the display unit 12*a*. The paper jam at a supply of the printing sheet may be occurred on the printer section 15, for instance. In this case, the screen managing part 21*a* specifies a situation or a location of the paper jam based on the notification from the status managing unit 22. The screen managing part 21*a* then obtains an error screen to indicate the user what he or she should operate to clear the paper jam from the screen DB 17, and displays the obtained screen on the display unit 12*a*. The error screen corresponding to the error occurred on the image processing device 3 is displayed on the display unit 12*a* on the operational panel 12. The error screen includes information to indicate the user what he or she should operate to fix the error. The error screen corresponds to the situation or the location of the paper jam. The error screen also depends on the device type of the image processing device 3.

The communication controller 23 is to be in communication with the server 2 or the other devices via the communication interface 13. When a confirmation request for the image processing device 3's status is received from the server 2, the communication controller 23 obtains the status information 18 from the status managing unit 22 and sends the obtained status information 18 to the server 2. Specifically, the communication controller 23 sends back the status information 18 as a response to the status confirmation request.

The server 2, the operational panel 4 or the information processing device 6 may place a request to obtain the screen information, which is currently displayed on the operational panel 12, to the communication controller 23. In this case, the communication controller 23 received the request obtains the current screen information managed by the screen managing part 21a, and sends the screen information back as the response.

When the communication controller 23 receives the job processing instruction from the server 2, it outputs the job processing instruction to the job controller 24.

The job controller 24 controls each of the scanner section 14, the printer section 15 and the fax section 16, thereby controlling processing of the job specified by the user. In the case where the job processing instruction is received from the panel controller 21, for example, the job controller 24 controls processing of the job with applying job settings, selection of which are made through the operational panel 12. When the communication controller 23 receives the job processing instruction from the server 2, the job controller 24 controls processing of the job with applying job settings specified by the application on the server 2.

Figure 3:
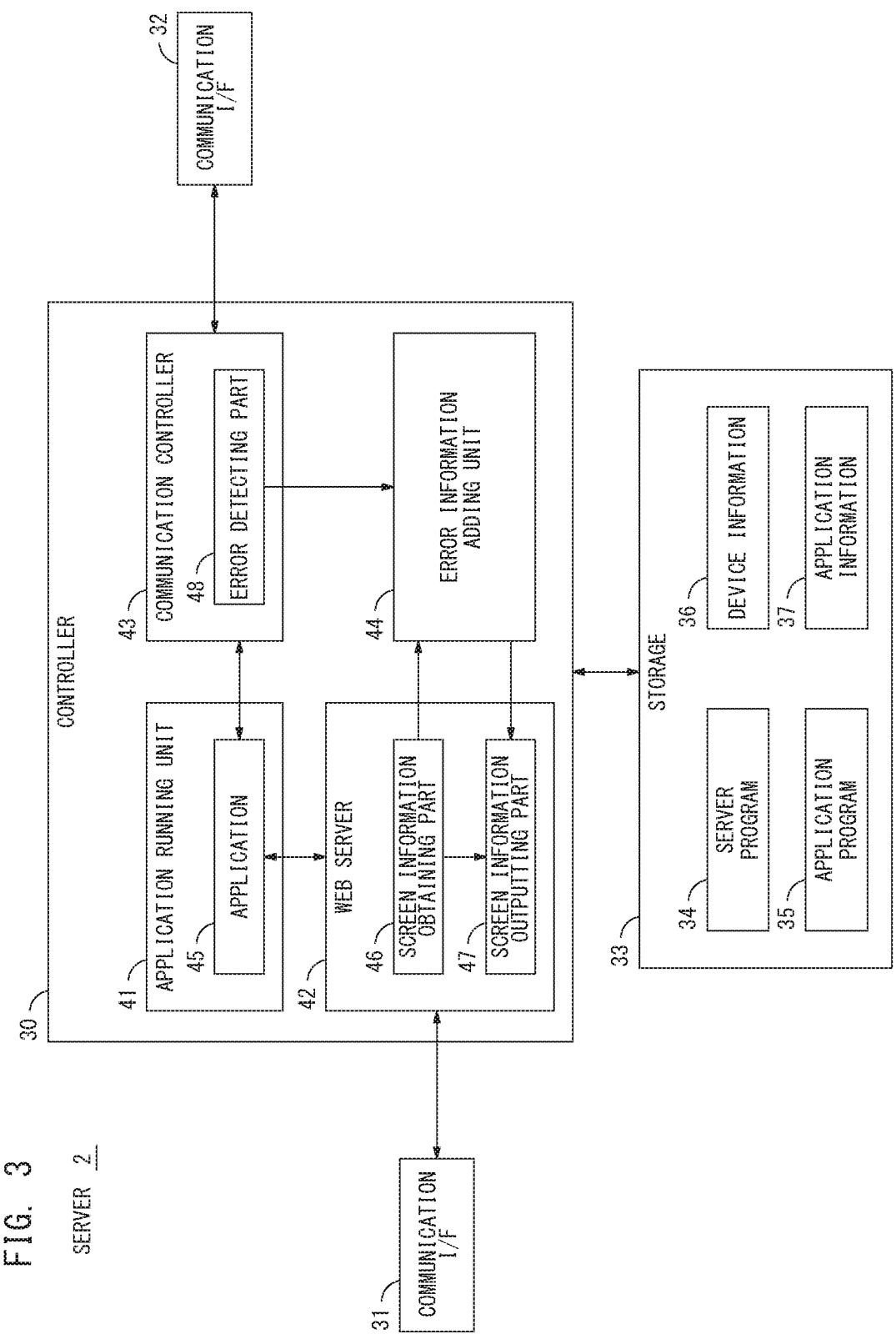
FIG. 3 is a block diagram showing an example of a hardware structure and a functional structure of a server according to one or more embodiments.

FIG. 3 is a block diagram showing an example of a hardware structure and a functional structure of the server 2. As its hardware structure, the server 2 includes a controller 30, a communication interfaces 31 and 32 and a storage 33.

The controller 30 may include a CPU and a memory, for instance. The controller 30 reads and executes a server program 34 in the storage 33 at a power supply. The controller 30 may then serve as an application running unit 41, a web server 42, a communication controller 43 and an error information adding unit 44.

The communication interface 31 is to be in communication with the operational panel 4 and/or the information processing device 6. The communication interface 32 connects the server 2 with the network 8 to be in communication with each of the multiple image processing devices 3. In the case where the operational panel 4 and the information processing device 6 are connected to the network 8 to which the multiple image processing devices 3 are connected, it is unnecessary to have the communication interface 31. Communications with the operational panel 4 and the information processing device 6 are performed via the communication interface 32.

The storage 33 is formed from a non-volatility device such as a hard disk drive (HDD) or a solid state drive (SSD), for example. An application program 35 run in the server 2 is stored in the storage 33 besides the aforementioned server program 34. The application programs 35 corresponding to the respective applications are stored in the storage 33. Also, device information 36 and application information 37 are stored in the storage 33.

The device information 36 includes information on each of the multiple image processing devices 3a, 3b, 3c and 3d to operate in cooperation with the server 2, which is registered in advance. FIG. 4 illustrates an example of the device information 36. As illustrated in FIG. 4, the device information 36 includes information on the server 2 and information on the multiple image processing devices 3a, 3b, 3c and 3d to operate in cooperation with the server 2. The information on each device is registered by an administrator of the server 2 when the new image processing device 3 is connected to the network 8, for instance. The information on each device in the device information 36 includes a device name and an IP address of each device. Information on functions in each image processing device 3 is also registered upon the registration of the image processing device 3. In the example of FIG. 4, "the image processing device A" corresponds to the image processing device 3a, "the image processing device B" corresponds to the image processing device 3b, "the image processing device C" corresponds to the image processing device 3c and "the image processing device D" corresponds to the image processing device 3d. Each image processing device 3a, 3b, 3c and 3d has a different detailed functional structure of the scan function and the print function.

The application information 37 includes information on the application installed on the server 2. FIG. 5 illustrates an example of the application information 37. As illustrated in FIG. 5, the application information 37 includes an application name 37a, a destination 37b, a use function 37c and a cooperate device 37d of each application registered with the server 2. The destination 37b indicates an address to access when an external device such as the operational panel 4 or the information processing device 6, for instance, accesses the server 2 to use the corresponding application. The use function 37c indicates the functions in the image processing device 3 to use when the corresponding application operates in cooperation with the image processing device 3. The use function corresponding to the application may be determined by an installer when the application is registered with the server 2, for example, and the use function 37c may be automatically registered. The use function 37c may also be registered manually by the administrator at the registration of the application 45. The cooperate device 37d indicates the image processing device 3 with which the corresponding application may operate in cooperation. The image processing device 3 that may process the job matching the use function corresponding to the application is registered as the cooperate device 37d. The installer refers to the device information 36 at the registration of the application with the server 2, for example, and automatically selects the image processing device 3 that may process the job matching the use function corresponding to the application. The cooperate device 37d is then registered. The cooperate device 37d may also be registered manually by the administrator at the registration of the application 45. The server 2 refers to the application information 37, thereby identifying the image processing, device 3 with which the application accessed by the external device may operate in cooperation from among the multiple image processing devices 3 when detecting the access from the external device, such as the operational panel 4 or the information processing device 6.

Functions of the controller 30 are explained next. The application running unit 41 reads and executes the application program 35 in the storage 33, thereby running an application 45. The application running unit 41 may run the application 45 on the server 2 all the times. The application running unit 41 may read and executes the application program 35 corresponding to the address when the access to the address indicated as the destination 37b in the application information 37 is detected, thereby running the application 45.

The application 45 constructs screen information that becomes a user interface to operate the image processing device 3 which is allowed to operate in cooperation of the multiple image processing devices 3, and outputs the constructed screen information. The application 45 also receives operation information from the external device, and controls the image processing device 3. Specifically, the application 45 sends and receives data to and from the image processing device 3 with which operation in cooperation is allowed via the communication controller 43. The data is sent and received by a predetermined protocol and/or command. The application 45 may then serve as a web application. A web page described in a language, such as HTML (HyperText Markup Language) or XML (Extensible Markup Language), for example, is output as the screen information by the application 45.

FIGS. 6A and 6B illustrate examples of screen information 51. As illustrated in FIG. 6A, the screen information 51 includes header information 51a and body information 51b. The header information 51a is added to a header part of the screen information 51. The header information 51a includes information on the browser 5 or 7, which may be the destination, and/or information on the application 45, which may be the sender, for example. The body information 51b corresponds to a body part of the screen information 51. The body of the screen information 51 includes a body that includes contents for display displayed by the browser 5 or 7. As illustrated in FIG. 6B, the body information 51b constructs the web page described in the language, such as HTML or XML. The browser 5 or 7 renders the information described in the body information 51b, and displays the web page provided by the application 45.

The web server 42 relays data communication by HTTP (Hypertext Transfer Protocol) between the browser 5 or 7 in the operational panel 4 or the information processing device 6 and the application 45. When detecting the access from the browser 5 or 7 via the communication interface 31, the web server 42 identifies the application 45 to access based on the destination 37b, the browser 5 or 7 is trying to access, and run the application 45.

The web server 42 includes a screen information obtaining part 46 and a screen information outputting part 47. The screen information obtaining part 46 obtains screen information to enable the browser 5 or 7 of the operational panel 4 or the information processing device 6 to display from the application 45. The screen information outputting part 47 sends the screen information obtained by the screen information obtaining part 46 to the operational panel 4 or the information processing device 6, and enables the browser 5 or 7 to display. In the case where the web server 2 detects the access from the browser 5 or 7, the screen information obtaining part 46 sends a request for an initial screen to the application 45 to access, and obtains the screen information corresponding to the initial screen from the application 45. The screen information outputting part 47 sends the screen information corresponding to the initial screen to the browser 5 or 7 which accesses the application 45. The screen information obtaining part 46 may then receive the operation information based on the user input from the browser 5 or 7. Upon the receipt, the screen information obtaining part 46 outputs the operation information to the application 45, and obtains the screen information updated in accordance with the operation information from the application 45. Once obtaining the screen information updated by the screen information obtaining part 46, the screen information outputting part 47 outputs the screen information to the browser 5 or 7.

Figure 7A:
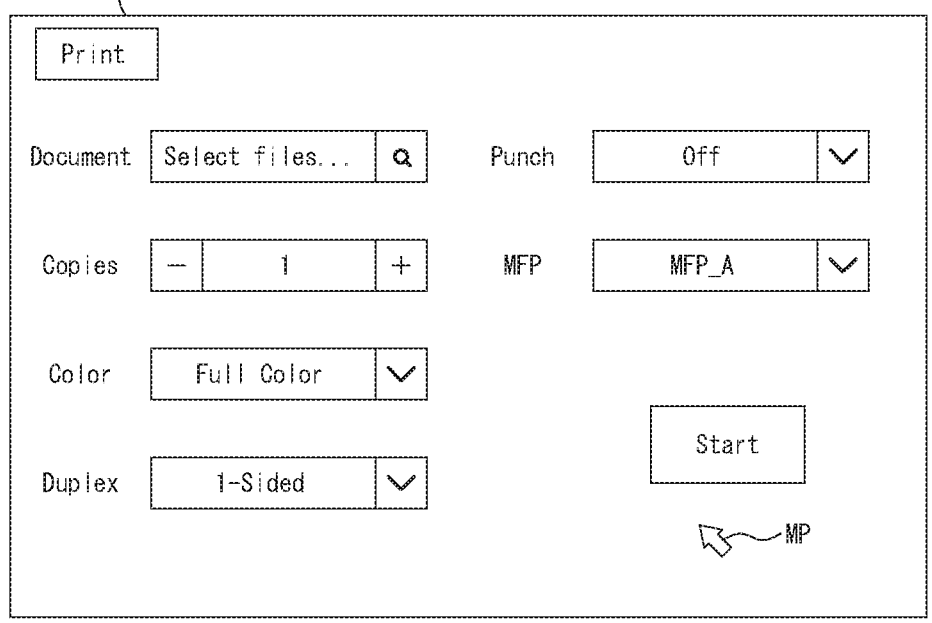
FIGS. 7A and 7B illustrate examples of a screen displayed by a browser according to one or more embodiments.
Figure 7B:
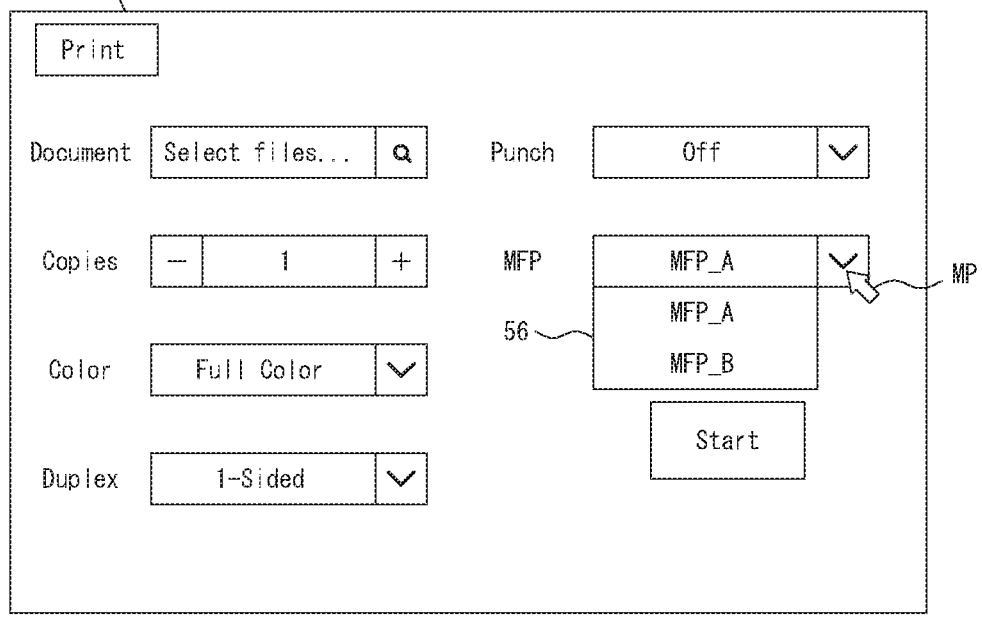

FIGS. 7A and 7B illustrate examples of a screen G1 displayed by the browser 5 or 7. The browser 5 or 7 renders the information described in the body information 51b in the screen information 51 as described earlier, thereby displaying the screen G1 as illustrated in FIG. 7A. The screen G1 of FIG. 7A includes multiple setting items those may be configured by the user. The user may move a mouse pointer MP, for example, to select and change the setting of any setting item. The screen G1 also includes a start button to start processing of the job. The user selects the start button to specify start of job processing.

The user is allowed to select the image processing device 3 with which the application 45 operates in cooperation through the screen G1. The user may move the mouse pointer MP to a predetermined position and clicks, for instance, a menu 56 showing the multiple image processing devices 3 with which the application 45 may operate in cooperation appears in a list form as illustrated in FIG. 7B. The user is allowed to select one of the multiple image processing devices 3 displayed in the menu 56 to enable cooperation with the application 45.

The communication controller 43 enables the web server 2 to be in communication with the image processing device 3 and/or the other devices via the communication interface 32. Upon receipt of the command or data which is output from the application 45 to the image processing device 3, the communication controller 43 sends the command or the data to the image processing device 3. Also, upon receipt of the information or the data to the application 45 from the image processing device 3, the communication controller 43 outputs the received information or data to the application 45.

The communication controller 43 includes an error detecting part 48. Once the web server 42 detects the access from the external device, for example, and the application 45 is being operated in the application running unit 41, the error detecting part 48 refers to the application information 37, and specifies the image processing device 3 with which the application 45 may operate in cooperation. The error detecting part 48 sends a status confirmation request to the image processing device 3 with which the application 45 may operate in cooperation. The error detecting part 48, for example, refers to the device information 36 and identifies the IP address of the image processing device 3. The error detecting part 48 attaches a predetermined command with the IP address and accesses the image processing device 3. The error detecting part 48 sends the status confirmation request. The error detecting part 48 then is allowed to obtain the status information 18 from the image processing device 3 with which the application 45 may operate in cooperation. Upon the receipt of the status information 18, the error detecting part 48 analyzes the status information 18, thereby determining whether or not the error is occurred on the image processing device 3. Specifically, the error detecting part 48 detects the occurrence of the error on the image processing device 3 based on the status information 18. In the case where the multiple image processing devices 3 with which the application 45 may operate in cooperation are registered with the application information 37, the error detecting part 48 obtains the status information 18 from each of the multiple image processing devices 3, and determines whether or not the error is occurred on each image processing device 3.

The error detecting part 48 may place the status confirmation request to the image processing device 3 on a periodical basis and determine the occurrence of the error based on the status information 18 obtained from the image processing device on the periodical basis as the application 45 is running in the application running unit 41.

Once the error detecting part 48 detects the occurrence of the error on the age processing device 3, it brings the error information adding unit 44 into operation. The error detecting part 48 notifies the error information adding unit 44 of the image processing device 3 on which the error is occurred.

When the error on the image processing device 3 is detected by the error detecting part 48, the error information adding unit 44 adds the error information to access the error screen constructed by the image processing device 3 to the screen information obtained from the application 45 by the screen information obtaining part 46. The error information adding unit 44 outputs the screen information with the error information to the screen information outputting part 47. Specifically, once the error is detected by the error detecting part 48, the screen information outputting part 47 outputs the screen information with the error information which is added by the error information adding unit 44 to the browser 5 or 7. At this time, the screen information outputting part 47 does not output the screen information obtained by the screen information obtaining part 46 as it is.

FIG. 8 illustrates an example of error information 52 added by the error information adding unit 44. There is an address (URL) for the image processing device 3 on which the error is occurred to obtain the screen information by accessing the screen information (error screen) currently displayed on the operational panel 12. The error information adding unit 44 adds an iframe code and the address (URL) in the bottom of the body information 51b in the screen information 51 as illustrated in a dashed box of FIG. 8.

After receiving the screen information 51 with the added error information 52, the browser 5 or 7 in the operational panel 4 or the information processing device 6 renders the body information 51b in the screen information 51. The body information 51b includes the error information 52. The browser 5 or 7 accesses an address of the image processing device 3 in the error information 52 and obtains the screen information (error screen) currently displayed on the image processing device 3. The browser 5 or 7 renders the screen information obtained from the image processing device 3, and displays the error screen as an inline frame in the screen information received from the application 45.

Figure 9:
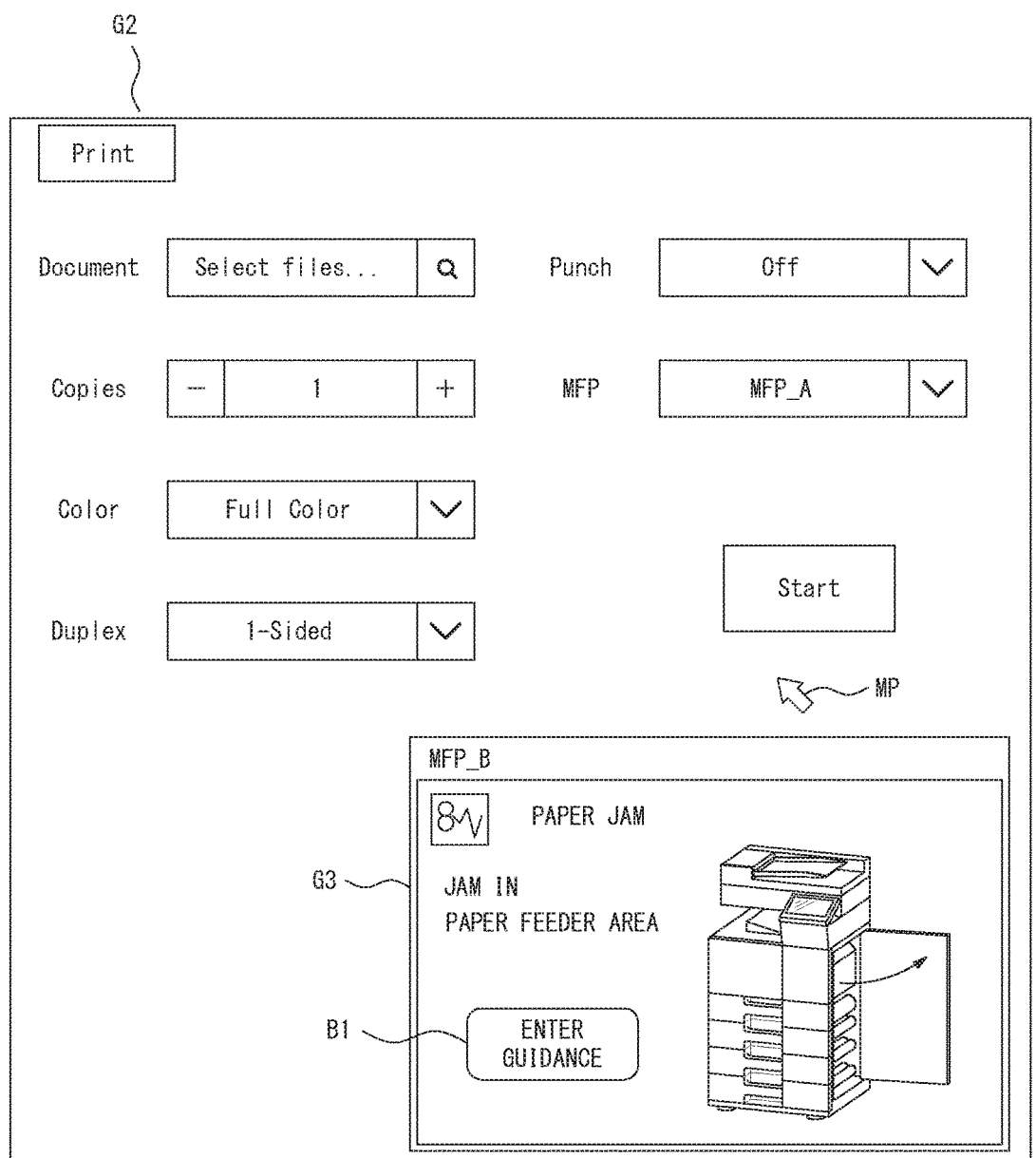
FIG. 9 illustrates an example of a screen displayed based on the screen information with the added error information.

FIG. 9 illustrates an example of a screen G2 displayed based on the screen information 51 with the added error information 52. As illustrated in FIG. 9, the screen G2 includes an error screen G3 based on the error information 52 added by the error information adding unit 44 inside the screen G1 of FIG. 7. The error screen G3 is the same screen as the error screen displayed on the image processing device 3 on which the error is occurred. The error screen G3 helps the user to identify easily what error is occurred. The error screen G3 includes a guidance button B1 to guide the user what operation should he or she perform to fix the error. When the user selects the guidance button B1, the browser 5 or 7 accesses the image processing device 3 to obtain guidance information and displays the information in the error screen G3.

The browser 5 or 7 directly obtains an image to be displayed in the error screen G3 from the image processing device 3 without going through the application 45, and the image is displayed. Even in the case where the error is occurred on the image processing device 3 with which the application 45 may operate in cooperation, the server 2 may enable the browser 5 or 7 to display the error screen G3 without involving the application 45. The error screen G3 is the screen displayed on the image processing device 3 on which the error is occurred. The error screen G3, therefore, may inform the user appropriately of what error is occurred on the device. There is no need for a developer to develop the error screen to fix a variety of errors that may be occurred on the image processing device 3. The developer is allowed to effectively develop the application 45.

Figure 10:
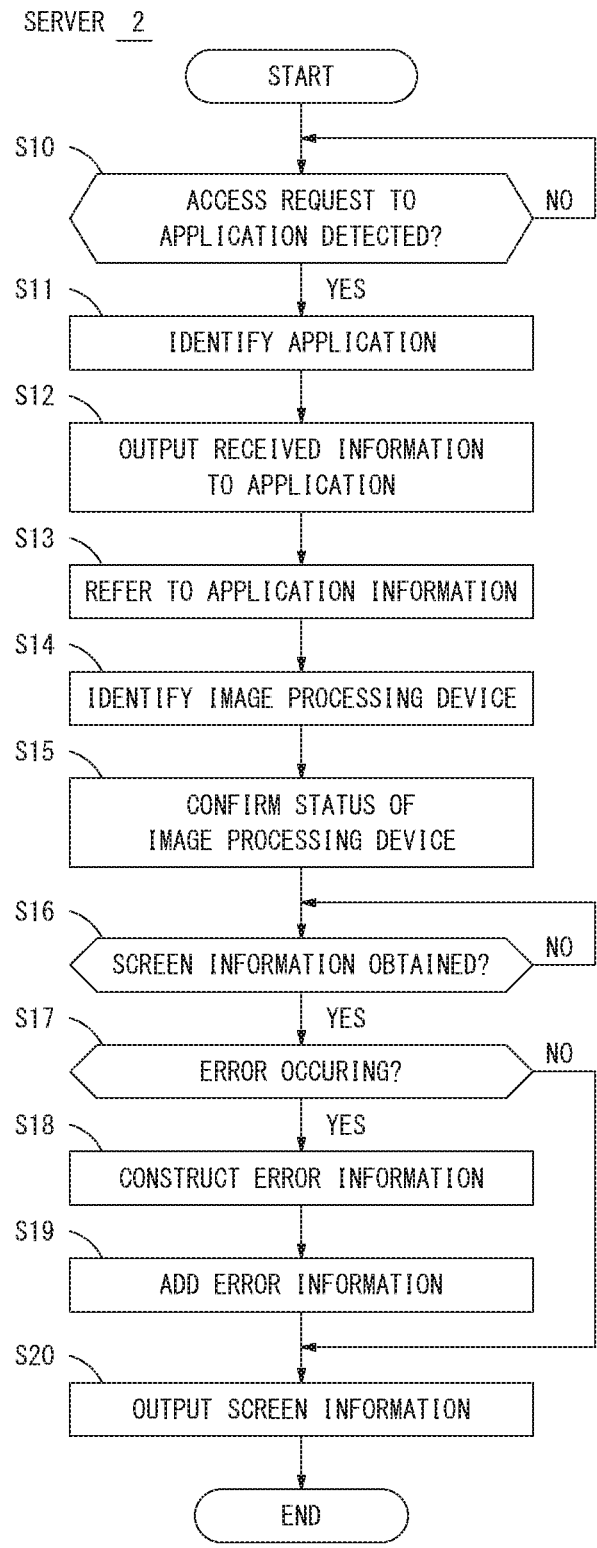
FIG. 10 is a flow diagram showing an exemplary process sequence performed on the server.

FIG. 10 is a flow diagram showing an exemplary process sequence performed on the server 2 which above-described structure. Upon start of the process, the server 2 goes into a standby state until detecting an access request to the application 45 from the browser 5 or 7 running on the external device such as the operational panel 4 or the information processing device 6 (step S10). When detecting the access request to the application 45, the server 2 identifies the application 45 to access (step S11), and outputs the received information from the browser 5 or 7 to the application 45 (step S12). As a result, the application 45 starts the process corresponding to the request from the browser 5 or 7. device 3 with which the application 45 may operate in cooperation (step S14). More than one image processing devices 3 may be identified in step S14. The server 2 sends the status confirmation request to the image processing device 3 thereby identified (step S15). The server 2 is allowed to obtain the status information 18 from the image processing device 3.

The server 2 determines whether or not the screen information 51 is received from the application 45 (step S16), and waits until obtaining the screen information 51. If the screen information 51 is obtained from the application 45 (when a result pf step S16 is YES), the server 2 analyzes the status information 18 obtained from the image processing device 3 to determine if the error is occurred on the image processing device 3 (step S17). The error may be occurred on the image processing device 3 (when a result of step S17 is YES). The server 2 then constructs the error information 52 to access the error screen created at the image processing device 3 (step S18). The error information 52 may include an address (URL) to access the error screen G3 on the image processing device 3. The server 2 adds the error information 52 to the screen information 51 obtained from the application 45 (step S19). The error may not be occurred on the image processing device 3 (when a result of step S17 is NO). The process in steps S18 and S19 is then skipped.

It is assumed, for example, that the application 45 may operate in cooperation with multiple image processing devices 3, and it is determined that the error is occurred on at least one of the multiple image processing devices 3. In such a case, the server 2 only constructs the error information 52 for the access to the image processing device 3 on which the error is occurred. The server 2 does not construct the error information 52 on the image processing device 3 on which no error is occurred. Only the error information 52 for the access to the error screen G3 on the image processing device 3 on which the error is occurred is added to the screen information 51.

The server 2 then sends the screen information 51 to the external device (step S20). The browser 5 or 7 may render the screen information 51 obtained from the server 2, and displays the web page provided by the application 45. If the error is occurred on the image processing device 3 that may operate in cooperation with the application 45, the error screen G3 is displayed inside the screen G2 as illustrated in FIG. 9. The screen G2 shows the web page provided by the application 45. Hence, the user is allowed to find easily the error is occurred on which image processing device 3 when selecting the image processing device 3 to input the job via the application 45. The user may exclude the image processing device 3 on the error is occurred not to input the job. The user may operate the error screen G3 to display the guidance information to fix the error, and he or she may fix the error appropriately before inputting the job.

As described above, the server 2 of one or more embodiments may run the application 45 that operates in cooperation with the image processing device 3. The server 2 obtains the screen information 51 to use the application 45 from the application 45 and outputs the screen information 51 to the external device based on the request from the external device. In the case where the error on the image processing device 3 with which the application 45 operates in cooperation is detected by the application 45, the server 2 adds the error information 52 to access the error screen G3 constructed by the image processing device 3 to the screen information 51 obtained from the application 45, and outputs the screen information 51 with the error information 52 to the external device.

As described above, even if the error is occurred on the image processing device 3 with which the application 45 operates in cooperation, it is not required to construct the detailed error screen relating to the occurred error on the application 45. The developer may construct the user interface without caring the error that may be occurred on the image processing device 3 in the development phase of the application 45. Efficiency in the development of the application 45 may be improved. As a result, the third vendor, for instance may easily develop the application 45.

As described above, if the error is occurred on the image processing device, which operates in cooperation with the application, the error screen may be displayed without the involvement of the application in the error. In the case where the error is occurred on the image processing device, the error screen relating to the error occurred on the image processing device may be displayed appropriately with the screen information displayed by the application, which is in operation on the server.

Figure 11:
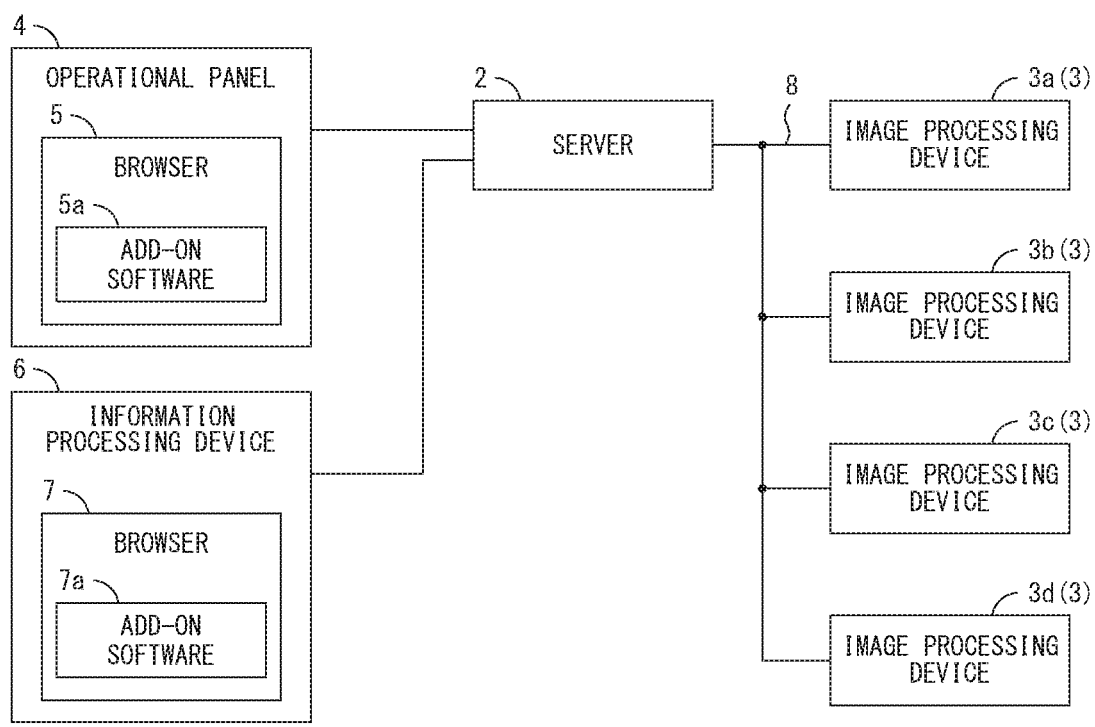
FIG. 11 illustrates an exemplary conceptual configuration of the image processing system in which one or more embodiments may be practiced.

FIG. 11 shows an exemplary conceptual configuration of an image processing system 1a in which one or more embodiments of the present invention may be practiced. An add-on software 5a is incorporated in the browser 5 of the operational panel 4 on the image processing system 1a of FIG. 11. An add-on software 7a is incorporated in the browser 7 of the information processing device 6. The add-on software 5a and 7a are dedicated software used to operate in cooperation with the server 2. The add-on software 5a and 7a operate when the browsers 5 and 7 are accessing the server 2.

It is assumed, for example, the occurrence of the error on the image processing device 3 with which the application may operate in cooperation is detected by the error detecting part 18. In this case, the error information adding unit 44 is brought into operation, and it adds the error information to the screen information 51 obtained from the application 45. According to one or more embodiments, when the error information adding unit 44 adds the error information, the error information is added to the header information 51a in the screen information 51 not the body information 51b in the screen information 51. The screen information outputting part 47 of the web server 42 outputs the screen information 51 including the header information 51a with the error information 53 to the browser 5 or 7.

Figure 12:
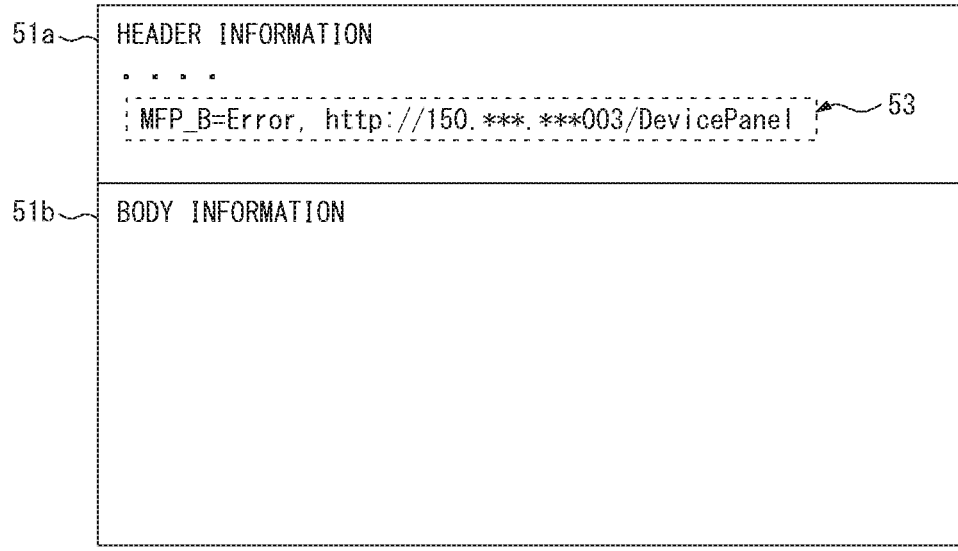
FIG. 12 illustrates an example of the error information added by the error information adding unit.

FIG. 12 illustrates an example of the error information 53 added by the error information adding unit 44. The error information includes the information on the image processing device 3 on which the error is occurred and the address (URL) to obtain the screen information by accessing the screen information (error screen) displayed on the image processing device 3. The error information adding unit 44 adds the error information in the bottom part of the header information 51a in the screen information 51 as illustrated in the dashed box of FIG. 12, for example.

After obtaining the screen information 51 from the server 2, the add-on software 5a or 7a in the browser 5 or 7 analyzes the header information 51a and determines whether or not the error information 53 is included in the header information 51a. The error information 53 may be included. The add-on software 5a or 7a then adds the error information 52 as illustrated in FIG. 8 to the body information 51b in the screen information 51 based on the error information 53. The add-on software 5a or 7a instructs the browser 5 or 7 for rendering based on the screen information 51 including the body information 51b with the error information 52. As a result, as well as in the above-described embodiments, the browser 5 or 7 accesses the image processing device 3 on which the error is occurred to obtain the error screen, and may display the error screen G3 in the web page obtained from the application 45 if the error information 52 is included in the body information 51b in the screen information 51.

Specifically, in one or inure embodiments, the capability to construct the screen information 51 including the error information 52 as illustrated in FIG. 8 is with the browsers 5 and 7 not the server 2. Even this configuration may provide the same working-effect as the one explained in the above-described embodiments. Everything else with one or more embodiments disclosed herein is the same as those explained in the above-described embodiments.

The above-described server 2 and one of the multiple image processing devices 3a, 3b, 3c and 3d are included in a single housing, which is an image processing unit 60 with one or more embodiments disclosed below.

Figure 13:
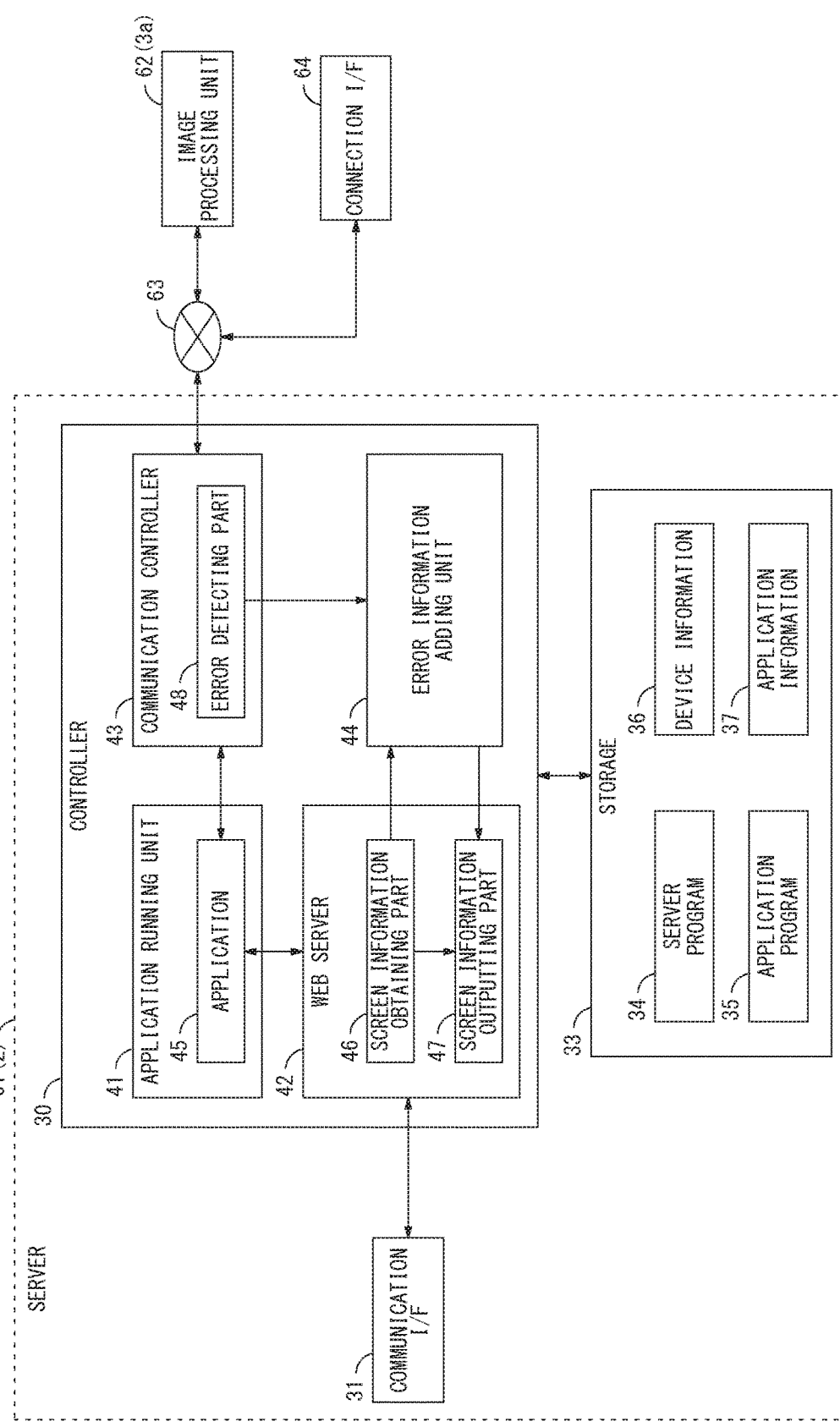
FIG. 13 illustrates a block diagram showing an example of a structure of an image processing unit according to one or more embodiments.

FIG. 13 illustrates a block diagram showing an example of a structure of the image processing unit 60. The image processing unit 60 including a server 61, an image processing unit 62, an internal network 63 and a connection interface 64 is configured as the single image processing device.

The server 61 has the same structure and functional structure as the server 2 as discussed earlier. The communication controller 43 is connected to the internal network 63, which allows the communication with the image processing unit 62 over the internal network 63.

The image processing unit 62 has the same structure functional structure as the image processing device 3a as discussed earlier. The image processing unit 62 in the image processing unit 60 becomes operative in response to the instruction from the server 61. It is not necessary for the image processing unit 62 to include the operational panel 12 as discussed earlier. The user interface provided by the application 45 on the server 61 is then used as the user interface to operate the image processing unit 62. The image processing unit 62 is connected to the internal network 63, and is allowed to be in communication with the server 61. The image processing unit 62 may operate in cooperation with the application 45 run on the server 61.

The connection interface 64 is to connect the other image processing devices 3b, 3c and 3d with the internal network 63 in the image processing unit 60. Once the other image processing devices 3b, 3c and 3d are connected to the connection interface 64, the application 45 running on the server 61 may process the job by also operating in cooperation with the other image processing devices 3b, 3c and 3d.

The external device such as the operational panel 4 and/or the information processing device 6 disclosed earlier is connected to the communication interface 31 in the server 61.

The image processing unit 60 has the capabilities of both the server 2 and the image processing device 3a as discussed earlier. The other image processing devices 3b, 3c and 3d are connected to the internal network 63, and the image processing system 1 and 1a with the embodiments disclosed herein may be constructed. The implementation of at least one image processing unit 60 allows the configuration of the image processing systems 1. and 1a discussed earlier with a connection to the connection interface 64 in the image processing unit 60 from the other image processing devices 3*b*, 3*c* and 3*d*. The image processing systems 1 and 1*a* may be constructed relatively easily in a place such as an office. The image processing unit 60 has the server 61 inside. It does not require a large space to install the image processing unit 60 compared to the installation of the separate server 2.

Also, in one or more embodiments, the error information 52 and 53 is added to the screen information 51 output from the application 45 and outputted to the browser 5 or 7 as well as in the above-described embodiments. The error screen G3 then may be displayed on the browser 5 or 7 without involving the application 45 in the error occurred on the image processing device 3. This configuration may provide the same working-effect as the ones explained in the above-described embodiments.

(Modifications)

While one or more embodiments of the present invention have been described above, the present invention is not limited to the above-described embodiments. Various modifications may be applied to the present invention.

In the above-described embodiments discussed earlier, for example, the error information 52 including the irate code and the address (URL) to obtain the screen information (error screen) from the image processing device 3 on which the error is occurred is added to the body information 51*b* in the screen information 51. In the above-described embodiments discussed earlier, the error screen G3 is displayed as the inline frame of the web page screen displayed based on the screen information 51 received from the application 45. The error screen G3 is not always displayed in such a manner. The error screen G3, for instance, may be displayed as a separate screen from the web page screen output from the application 45. The error information 52 added to the screen information 51 may include another code to display another screen, which is not the frame code. In such a case, the error screen G3 may be displayed in a tab screen which is different from the tab screen displaying the web page received from the application 45. Alternatively, the error screen G3 may be displayed in a browser screen which is different from the browser screen displaying the web page received from the application 45.

Although the disclosure has been described with respect to only a limited number of embodiments, those skilled in the art, having benefit of this disclosure, will appreciate that various other embodiments may be devised 10. without departing from the scope of the present invention. Accordingly, the scope of the invention should be limited only by the attached claims.

What is claimed is:

1. A server connected to a plurality of image processing devices over a network, comprising:
    a storage that stores an application program; and
    a hardware processor that:
        runs the application program that operates in cooperation with the image processing devices;
        obtains screen information to use the application program from the application program based on a request from an external device;
        outputs the screen information obtained from the application program to the external device;
        detects an error on at least one of the image processing devices; and
        adds error information to access an error screen constructed by the at least one of the image processing devices to the screen information obtained from the application program when the error on the at least one of the image processing devices is detected, wherein
    the hardware processor outputs the screen information with the added error information to the external device when the error information is added to the screen information, and
    the storage further stores application information that includes cooperative device information indicating an image processing device, from among the plurality of image processing devices, that is configured to execute the application program.

2. The server according to claim 1, wherein
    the hardware processor obtains a web page to use the application program as the screen information based on the request from a browser running on the external device, and
    adds an address to access the error screen constructed by the at least one of the image processing devices as the error information to the web page.

3. The server according to claim 1, wherein the hardware processor adds the error information in a manner that allows the error screen constructed by the at least one of the image processing devices to be displayed inside the same screen as the screen information obtained from the application program.

4. The server according to claim 1, wherein the hardware processor adds the error information in a manner that allows the error screen constructed by the at least one of the image processing devices to be displayed on the screen different from the screen information obtained from the application program.

5. The server according to claim 1, wherein the hardware processor adds the error information to a body of the screen information obtained from the application program.

6. The server according to claim 1, wherein the hardware processor adds the error information to a header of the screen information obtained from the application program.

7. An image processing unit, comprising the server according to claim 1.

8. The image processing unit according to claim 7, wherein
    other image processing devices are connected to the network.

9. A non-transitory recording medium storing a computer readable program executed by a server connected to a plurality of image processing devices over a network, wherein the server comprises: a storage that stores an application program; and a hardware processor, the program causing the hardware processor to execute:
    (1) running the application program that operates in cooperation with the image processing devices;
    (2) obtaining screen information to use the application program from the application program based on a request from an external device;
    (3) outputting the screen information obtained from the application program to the external device;
    (4) detecting an error on at least one of the image processing devices; and
    (5) adding error information to access an error screen constructed by the at least one of the image processing devices to the screen information obtained from the application program when the error on the at least one of the image processing devices is detected, wherein
    the screen information with the added error information is output to the external device when the error information is added to the screen information, and the storage further stores application information that includes cooperative device information indicating an image processing device, from among the plurality of image processing devices, that is configured to execute the application program.

10. The non-transitory recording medium according to claim 9, wherein the program causes the server to further execute:

obtaining a web page to use the application program as the screen information based on the request from a browser running on the external device, and adding an address to access the error screen constructed by the at least one of the image processing devices as the error information to the web page.

11. The non-transitory recording medium according to claim 9, wherein the program causes the server to further execute:

adding the error information in a manner that allows the error screen constructed by the at least one of the image processing devices to be displayed inside the same screen as the screen information obtained from the application program.

12. The non-transitory recording medium according to claim 9, wherein the program causes the server to further execute:

adding the error information in a manner that allows the error screen constructed by the at least one of the image processing devices to be displayed on the screen different from the screen information obtained from the application program.

13. The non-transitory recording medium according to claim 9, wherein the program causes the server to further execute:

adding the error information to a body of the screen information obtained from the application program.

14. The non-transitory recording medium according to claim 9, wherein the program causes the server to further execute:

adding the error information to a header of the screen information obtained from the application program.

* * * * *